United States Patent [19]
Fukuoka

[11] 4,317,189
[45] Feb. 23, 1982

[54] VOICE FREQUENCY SIGNAL ACTUATED TAPE RECORDER

[75] Inventor: Norio Fukuoka, Hachioji, Japan

[73] Assignee: Olympus Optical Company Limited, Tokyo, Japan

[21] Appl. No.: 101,650

[22] Filed: Dec. 10, 1979

[30] Foreign Application Priority Data

Dec. 13, 1978 [JP] Japan ................................ 53-154756

[51] Int. Cl.$^3$ ............................................. G11B 31/00
[52] U.S. Cl. ......................................... 369/7; 369/50; 179/1 VC
[58] Field of Search ................... 179/100.1 VC, 1 VC, 179/100.11; 340/148; 369/6, 7, 50

[56] References Cited

U.S. PATENT DOCUMENTS

| | | | |
|---|---|---|---|
| 2,410,835 | 11/1946 | Montague | 179/100.1 VC |
| 2,411,501 | 11/1946 | Brubaker | 179/100.1 VC |
| 3,436,662 | 4/1969 | Kobayashi | 179/100.1 VC |
| 4,075,435 | 2/1978 | Eppler, Jr. | 179/100.1 VC |
| 4,120,009 | 10/1978 | Iwasawa | 179/100.1 VC |
| 4,188,549 | 2/1980 | Dorais | 340/148 |

Primary Examiner—Raymond F. Cardillo, Jr.
Attorney, Agent, or Firm—Toren, McGeady and Stanger

[57] ABSTRACT

A voice starting device for actuating a tape recorder with a voice signal is disclosed. In the device, a comparator compares the voice signal with a preset reference voltage and actuates a switching element for driving a motor circuit. A charging circuit stores the output of the comparator to maintain the output of the comparator for a predetermined time after termination of the voice signal.

4 Claims, 6 Drawing Figures

VOICE FREQUENCY SIGNAL ACTUATED TAPE RECORDER

BACKGROUND OF THE INVENTION

The present invention relates to a voice actuating device for driving a tape recorder with a voice signal.

Recently, there has been a tendency to use a tape recorder provided with a voice actuating device for starting a motor circuit in response to a voice signal and setting the tape recorder into the recording mode.

A voice actuating device permits controlling a motor circuit and a recording circuit only in response to a voice signal, so that it is very effective for saving battery power and prolonging its life in a superminiaturized tape recorder.

In such voice starting device, it is most important to start the tape recorder as quick as the voice signal is received and reset the tape recorder within a certain time after the termination of the voice signal, in order to perform a stable voice starting without changing start and reset time of a tape recorder in accordance with the duration of the voice signal. Particularly, in the tape recorder with the use of a battery as electric supply source, it is necessary to secure the stable action against fluctuation of an electric supply voltage.

SUMMARY OF THE INVENTION

An object of the present invention is to provide a voice starting device of a tape recorder which can satisfy all of the above described conditions.

According to the present invention there is provided a voice starting device for starting and driving a tape recorder with a voice signal, comprising a comparator for generating an output signal by comparing the voice signal with a preset reference voltage, a switching element actuated by the output signal of the comparator for driving a motor circuit, and a charging and discharging circuit connected to an input terminal for receiving the voice signal of the comparator for maintaining the output signal of the comparator for a certain time after termination of the voice signal.

DESCRIPTION OF THE PREFERRED EMBODIMENT

Figure 1:
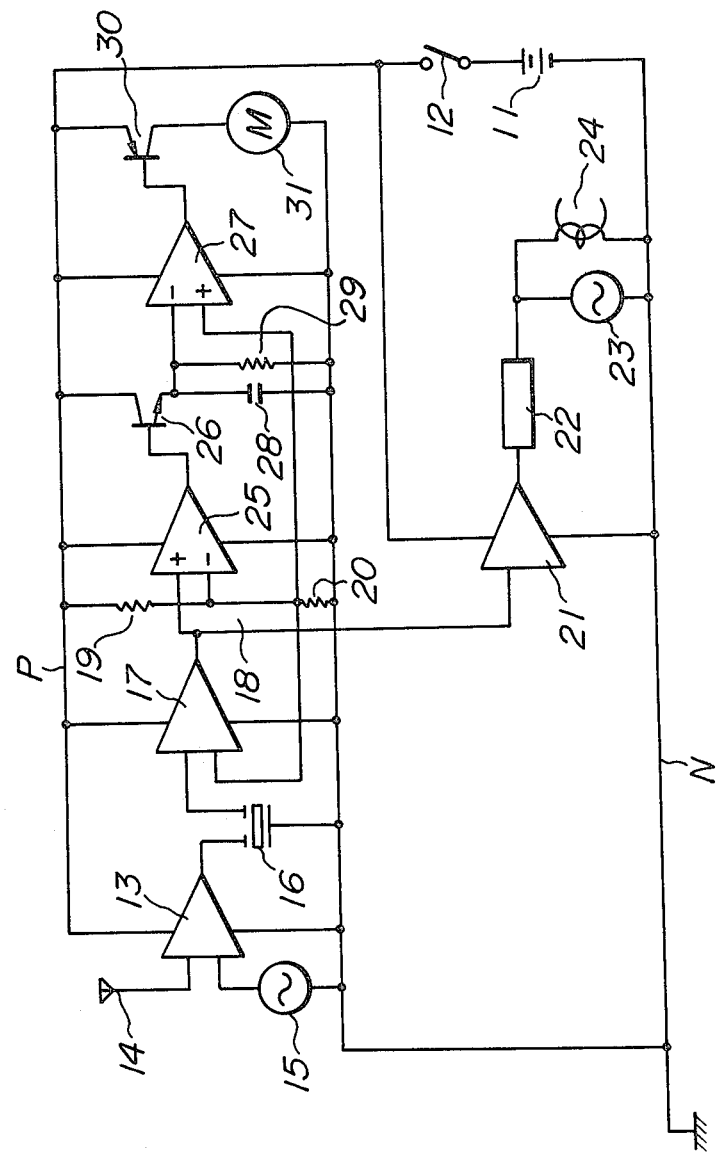
FIG. 1 is a circuit diagram showing one embodiment of a voice starting device of a tape recorder according to the present invention.

FIG. 1 shows an embodiment of the present invention in a wireless system using an FM signal. In FIG. 1, a DC electric supply source 11 is connected to a bus P through an electric power supply switch 12 at a positive terminal and further connected to a bus N at a negative terminal.

A mixer 13 is connected between the buses P and N. This mixer 13 is also connected to an antenna 14 at one input terminal and to a local oscillator 15 at the other input terminal.

In this case, the antenna 14 receives an FM signal modulated by a voice signal (i.e., a voice frequency signal,) from a source which is not shown.

The output terminal of the mixer 13 is connected to one input terminal of an FM detector 17 through a filter 16. This FM detector is connected between the buses P and N, and the other input terminal thereof is connected to a reference voltage generating circuit 18. The reference voltage generating circuit 18 includes resistors 19 and 20 connected in series between the buses P and N. The junction point of these resistors 19 and 20 is connected to the other input terminal of the FM detector 17 as a reference voltage output terminal.

Figure 2:
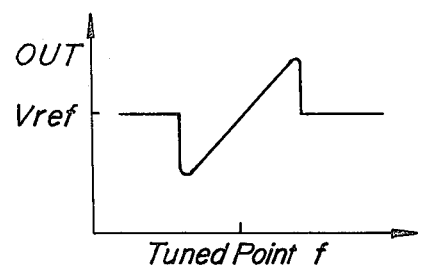
FIG. 2 is a schematic diagram showing a characteristic of an FM detector used in the device shown in FIG. 1.

In this case, the FM detector 17 forms a quadrature detecting (phase detecting) circuit, and its output waveform is the so-called S-shaped curve shown in FIG. 2 and characteristic of an FM detector generally.

In FIG. 2, Vref is a reference voltage f.

The aforementioned constitutes an FM receiving section of the system.

The output terminal of the detector 17 is connected to an amplifier 21. The amplifier 21 is connected between the buses P and N, the output terminal thereof is connected to a recording equivalent or equalization circuit 22, and a bias circuit 23 and a recording head 24 are connected to the output terminal of the equalization circuit 22. These members form a recording circuit of a tape recorder.

The output terminal of the detector 17 is connected to the positive input terminal of a comparator 25. The comparator 25 is connected between the buses P and N, and a negative input terminal thereof is connected to the junction point of the resistors 19 and 20 of the reference voltage generating circuit 18. When the output signal of the detector circuit 17 is larger than the reference voltage in this case, a digital "1" output is produced by the comparator 25.

The output terminal of the comparator 25 is connected to the base of a transistor 26. The transistor 26 has a collector connected to the bus P and an emitter connected to a negative input terminal of a comparator 27. Moreover, the emitter of the transistor 26 is connected to the bus N through a charging and discharging circuit composed of a capacitor 28 and a resistor 29.

The comparator 27 is connected between the buses P and N, and the positive input terminal thereof is connected to the junction point of the resistors 19 and 20 of the reference voltage generating circuit 18, so that when the input signal supplied to the negative input terminal of the comparator 27 is larger than the reference voltage in this case, a digital "0" output is produced by the comparator 27.

The output terminal of the comparator 27 is connected to a switching element, for example the base of a transistor 30. The transistor 30 has an emitter connected to the bus P and a collector connected to the bus N through a motor 31 of a motor circuit.

In operation, the electric power supply switch 12 is first thrown. In this condition, when an FM signal corresponding to a voice signal is generated by a source, which is not shown, the FM signal is received by the antenna 14. Then, the mixer 13 generates an intermediate frequency signal based on the output signal of the local oscillator 15 and this IF signal is supplied to the detector 17 through the filter 16, so that a voice output shown in FIGS. 3a and corresponding to the voice signal is produced by the detector 17.

The voice output is supplied to the comparator 25. The "1" output shown in FIG. 3b emerges from the comparator 25 so that the transistor 26 turns ON. Then, a terminal voltage of the capacitor 28 is raised with charging (FIG. 3c). Further, the ON transistor 26 makes the comparator 27 produce an output "0" as shown in FIG. 3d, and thereby to turn the transistor 30 ON and start the motor 31. In this case, the ON condition of the transistor 26, drives the output of the comparator 27 to "0" regardless of the charging of the capactior 28. Hence, the transistor 30 is turned ON and the motor 31 is quickly started.

The voice output of the detector 17 is supplied to the amplifier 21 and the output of the amplifier 21 is supplied to the recording head 24 through the circuit 22. As a result, the voice output is recorded on a tape.

Figure 3A:
FIGS. 3a–3d illustrates a time chart for explaining the operation of the voice starting device according to the present invention.
Figure 3B:
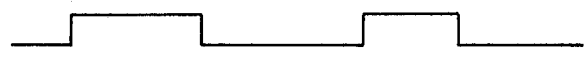
Figure 3C:
Figure 3D:

When the voice signal received by the antenna 14 is terminated and the voice signal of the detector 17 disappears as shown in FIG. 3a, the output of the comparator 25 goes low as shown in FIG. 3b and the transistor 26 turns OFF. Hence, the terminal voltage of the capacitor 28 discharges and gradually falls as shown in FIG. 3c. In this case, the discharging time of the capacitor 28 is determined by a time formed with the resistor 29.

When the terminal voltage of the capacitor 28 is lowered to a predetermined value, the comparator 27 generates a high as shown in FIG. 3d, thereby to turn the transistor 30 OFF and stop the motor 31. In this case, after the transistor 26 is turned OFF, and after the discharging time determined by the time constant of the capacitor 28 and the resistor 29, the output of the comparator 27 goes high, the transistor 30 is turned OFF and the motor 31 is stopped. Hence, the reset time of the motor 31 can be made constant by the time constant of the capacitor 28 and the resistance 29 and the reference voltage of the comparator 27.

Therefore, according to the above construction, the tape recorder can quickly be started by the input of the voice signal and the tape recorder can be turned off a predetermined time after the voice signal is terminated. Hence, a constantly stable voice starting can be expected regardless of the duration of the voice signal. Moreover, the quadrature detecting circuit used as an FM detector 17 in the above embodiment changes an offset voltage when the electric supply voltage is changed. However, in this case, the reference voltage of the comparator is also changed, so that this has no influence on the operating level and secures stable operation despite any fluctuation of supply even with a battery source. In addition, such a comparator and transistor are suitable for a monolithic IC and particularly suitable for a superminiature tape recorder.

The present invention is not limited to the above embodiment but can be modified without departing from the scope of the invention. For example, the above embodiment relates to the wireless system with the use of an FM signal, but a voice signal entered into a microphone can be used as it is.

What is claimed is:

1. A starting device for a tape recorder by voice signal comprising an FM receiver section having an FM detector means coupled to the detector for detecting a modulated voice signal, a reference voltage source, a first comparator for generating an output signal by comparing the output FM signal of the FM receiver with a reference voltage preset by the reference voltage source, a switching element controlled and actuated by the output signal of the first comparator, a charging and discharging circuit connected to the element for holding the output signal of the first comparator for a predetermined time after termination of the voice signal, a second comparator connected to receive the terminal voltage of the charging and discharging circuit for controlling a motor, said reference voltage source being connected for supplying the preset reference voltage to the first and the second comparators.

2. A starting device as in claim 1, wherein the FM receiver section comprises a mixer circuit for mixing the output signal of a local oscillator with a signal received by an antenna and the charging and discharging circuit comprising at least a capacitor and a resistor.

3. A starting device as in claim 1, wherein the FM detector circuit is a quadrature detector and the switching element is an NPN type transistor.

4. A starting device as in claim 1, wherein the reference voltage source comprises a resistance type voltage divider provided between buses, and the reference voltage of the divider is supplied to an inverted input of the first comparator and to a non-inverted input of the second comparator.

* * * * *